(12) United States Patent
Biffert

(10) Patent No.: US 12,216,483 B2
(45) Date of Patent: *Feb. 4, 2025

(54) FLOOD CONTROL SYSTEM

(71) Applicant: Kevin N. Biffert, Horace, ND (US)

(72) Inventor: Kevin N. Biffert, Horace, ND (US)

( * ) Notice: Subject to any disclaimer, the term of this patent is extended or adjusted under 35 U.S.C. 154(b) by 571 days.

This patent is subject to a terminal disclaimer.

(21) Appl. No.: 17/582,140

(22) Filed: Jan. 24, 2022

(65) Prior Publication Data

US 2022/0147071 A1  May 12, 2022

Related U.S. Application Data

(63) Continuation of application No. 17/306,011, filed on May 3, 2021, now Pat. No. 11,231,728, which is a continuation of application No. 16/820,104, filed on Mar. 16, 2020, now Pat. No. 10,996,687.

(51) Int. Cl.
| | |
|---|---|
| *E03F 1/00* | (2006.01) |
| *E03F 5/10* | (2006.01) |
| *F16K 7/10* | (2006.01) |
| *G05D 7/06* | (2006.01) |

(52) U.S. Cl.
CPC ........... *G05D 7/0652* (2013.01); *E03F 1/002* (2013.01); *E03F 5/103* (2013.01); *F16K 7/10* (2013.01)

(58) Field of Classification Search
CPC . E03F 1/001; E03F 1/002; E03F 5/103; E03F 7/02; G05D 7/0652
See application file for complete search history.

(56) References Cited

U.S. PATENT DOCUMENTS

| | | |
|---|---|---|
| 5,672,028 A | 9/1997 | Mehta |
| 6,997,201 B2 | 2/2006 | Preul |
| 7,000,641 B2 | 2/2006 | Welfare |
| 7,143,781 B2 | 12/2006 | Boner |
| 7,357,146 B2 | 4/2008 | Beaty |

(Continued)

FOREIGN PATENT DOCUMENTS

GB  2472027 A  1/2011

OTHER PUBLICATIONS

An Innovative Approach to Flood Mitigation in the Red River Basin: Waffle Project; Report by EERC—University of ND; Part 1—pp. 1-114; Dec. 2007.

(Continued)

*Primary Examiner* — Sunil Singh
(74) *Attorney, Agent, or Firm* — Neustel Law Offices

(57) ABSTRACT

A flood control system for remotely and automatically controlling flooding and water storage on reservoirs. The flood control system generally includes a central computer that controls the water level by controlling or communicating with flow control gates positioned near a number of culverts, wherein each flow control gate typically includes: (a) a control unit communicatively coupled to the central computer, the control unit capable of sending local condition data to the central computer via a wireless connection and further capable of receiving control commands from the central computer; (b) an input/output interface capable of receiving signals or data regarding physical conditions proximate the flow control gate, the input/output interface coupled to the control unit; and (c) a water shutoff valve controllable by the control unit and positioned to selectively allow or block the flow of water through each culvert, wherein each control unit controls each water shutoff valve.

20 Claims, 15 Drawing Sheets

(56) References Cited

U.S. PATENT DOCUMENTS

| | | |
|---|---|---|
| 8,353,308 B2 | 1/2013 | Parran |
| 8,608,404 B2 | 12/2013 | Safreno |
| 9,157,227 B2 | 10/2015 | Savaria |
| 9,541,432 B2 | 1/2017 | Kertesz |
| 9,952,601 B2 | 4/2018 | Choy |
| 10,996,687 B1 | 5/2021 | Biffert |
| 2015/0134126 A1 | 5/2015 | Augusto |
| 2017/0089056 A1 | 3/2017 | Schafter |
| 2018/0045356 A1 | 2/2018 | Sutton |

OTHER PUBLICATIONS

An Innovative Approach to Flood Mitigation in the Red River Basin: Waffle Project; Report by EERC—University of ND; Part 2—pp. 115-228; Dec. 2007.
An Innovative Approach to Flood Mitigation in the Red River Basin: Waffle Project; Report by EERC—University of ND; Part 3—pp. 229-356; Dec. 2007.
An Innovative Approach to Flood Mitigation in the Red River Basin: Waffle Project; Report by EERC—University of ND; Part 4—pp. 357-524; Dec. 2007.
https://www.petersenproducts.com/113-Series-High-Expansion-Pipe-Plugs-1-and-Larger-s/1957.htm; Peterson Products Company Bag Style Pipe Plug Webpage; Printed Feb. 20, 2020.

FLOOD CONTROL SYSTEM

CROSS REFERENCE TO RELATED APPLICATIONS

The present application is a continuation of U.S. application Ser. No. 17/306,011 filed on May 3, 2021 which issues as U.S. Pat. No. 11,231,728 on Jan. 25, 2022, which is a continuation of U.S. application Ser. No. 16/820,104 filed on Mar. 16, 2020 now issued as U.S. Pat. No. 10,996,687. Each of the aforementioned patent applications is herein incorporated by reference in their entirety.

STATEMENT REGARDING FEDERALLY SPONSORED RESEARCH OR DEVELOPMENT

Not applicable to this application.

BACKGROUND

Field

Example embodiments in general relate to a flood control system for alleviating flooding within flood-prone geographic areas.

Related Art

Any discussion of the related art throughout the specification should in no way be considered as an admission that such related art is widely known or forms part of common general knowledge in the field.

Existing roads that are generally at a higher elevation than the land areas between the roads can be used as levees to store water by using the land as small reservoirs. For example, roads are often spaced in increments of miles, and a square mile of land between roads having water one foot deep would store more than 200 million gallons of water. In conjunction with the roads, existing culverts can be used to help control water flow, and may be "closed" so that water will be retained in the informal "reservoirs", rather than flowing to a river or other body of water.

SUMMARY

An example embodiment is directed to a flood control system. The system allows for the remote control of water flow through existing channels, such as culverts, pipes, drain tiles, etc., wherein the flow can be blocked or allowed in groups or controlling flow through each channel individually. By enabling remote control, cumbersome methods of using existing roads as reservoirs becomes practical and useful, as compared to manual gates, which are highly impractical where a large number of reservoirs are needed to contain and store water to reduce the amount of water that reaches a river, for example.

The flood control system may include a central computer capable of receiving and storing data and providing control commands usable by the flood control system. The central computer can ultimately control the water level in a plurality of reservoirs used for storing water, wherein each reservoir comprises a channel positioned to drain its associated reservoir. The central computer controls the water level by also controlling or communicating with a plurality of flow control gates positioned near a plurality of the channels, wherein each flow control gate comprises: (a) a control unit communicatively coupled to the central computer, the control unit capable of sending a set of local condition data to the central computer via a wireless connection and further capable of receiving control commands from the central computer; (b) an input/output interface capable of receiving signals or data regarding physical conditions proximate the flow control gate, the input/output interface coupled to the control unit; and (c) a water shutoff valve controllable by the control unit and positioned to selectively allow or block the flow of water through each channel, wherein each control unit controls each water shutoff valve.

In an example embodiment, each water shutoff valve may comprise an inflatable bladder or other structure, such as a motor-driven valve, linear actuated valve, a pump (such as a pump that does not allow water flow unless it is running), etc. If an inflatable bladder is used, the inflatable bladder can be positioned within a channel, such as a pipe or culvert and, when inflated, will block or reduce the flow of water through the channel. Further, each flow control gate may comprise an inflation means to selectively inflate the inflatable bladder under control of the control unit, either in response to a central computer, a wireless device (e.g., via Bluetooth or Wi-Fi, or under autonomous control of the control unit. Each flow control gate may also comprise a valve driven by the control unit to deflate the inflatable bladder as required. In the example embodiment, one or more flow control gates may comprise an air compressor coupled to the inflatable bladder to selectively inflate the inflatable bladder in response to the control unit. Alternatively, the inflatable bladder can be inflated from a source of compressed air at each flow control gate, such as a small tank with a refilling valve accessible from the outside of any enclosure, if present.

Each flow control gate may further comprise a solar panel adapted to charge a battery, wherein the battery provides electrical power to the control unit and the compressor. In example embodiments, the control unit, the battery, and the solar panel may be mounted on a hollow pipe or equivalent structure to allow sensitive parts of the system, and particularly of the flow control gate, to remain above water level and thus be somewhat protected. Further, components such as the battery, control unit, camera, communication components, antenna, and compressor may be enclosed, partially enclosed, or protected within one or more enclosures.

In example embodiments, each flow control gate may also include a level sensor positioned near each channel or culvert and coupled to the input/output interface to provide water level data to the control unit. The water level data may be part of the set of local condition data. The local condition data may also include image information from a camera, water flow data, battery status and charge state, bladder air pressure level, air valve position information, etc.

The data stored in, or accessible to, the central computer comprises topographical data proximate the location of the plurality of reservoirs, as well as water level, flow rate, shutoff valve position, etc. The topographical data is usable by the central computer to determine the quantity of water stored in each of the plurality of reservoirs and for calculating or storing the water level of a river or body of water into which the reservoirs drain or feed.

In other example embodiments, each flow control gate may comprise a plurality of sensors capable of providing sensor data to the control unit, the sensor data usable for control of the water shutoff valve. The plurality of sensors may comprise one or more of a wind monitor, a temperature sensor, a rain sensor, a water level sensor, a water pressure sensor, an air pressure sensor, a voltage sensor, and a camera. Each control unit may process, store locally, and communicate sensor data to the central computer. Each control unit may control each water shutoff valve in response to control commands received by the control unit from the central computer. For example, each control unit can control each water shutoff valve in response to control commands received wirelessly by the control unit.

There has thus been outlined, rather broadly, some of the embodiments of the flood control system in order that the detailed description thereof may be better understood, and in order that the present contribution to the art may be better appreciated. There are additional embodiments of the flood control system that will be described hereinafter and that will form the subject matter of the claims appended hereto. In this respect, before explaining at least one embodiment of the flood control system in detail, it is to be understood that the flood control system is not limited in its application to the details of construction or to the arrangements of the components set forth in the following description or illustrated in the drawings. The flood control system is capable of other embodiments and of being practiced and carried out in various ways. Also, it is to be understood that the phraseology and terminology employed herein is for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

DETAILED DESCRIPTION

A. Overview

Figure 1:
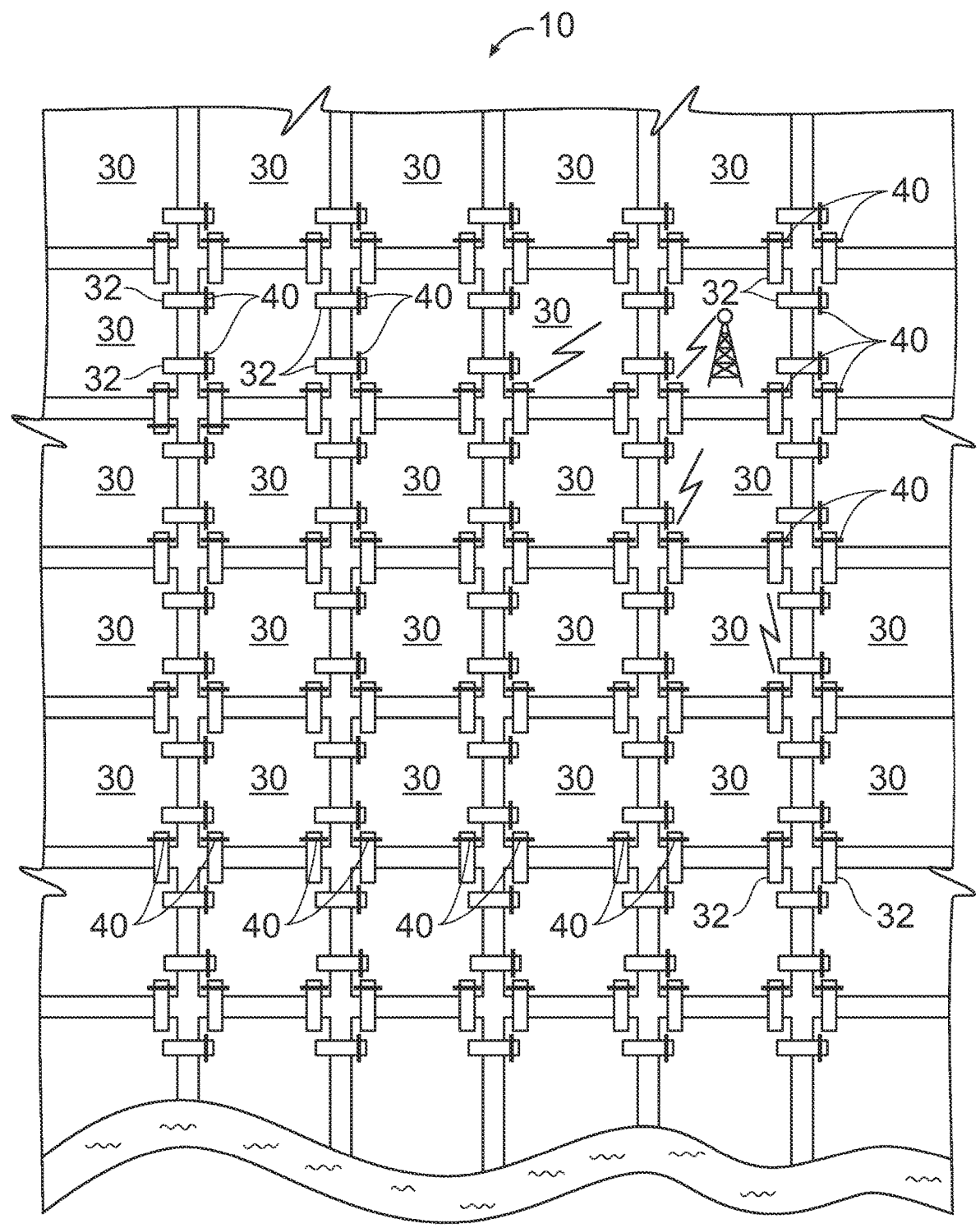
FIG. 1 is a top view of a flood control system in accordance with an example embodiment.

An example flood control system 10 generally includes central computer 20 capable of receiving and storing data and providing control commands usable by the flood control system 10. The central computer 20 can ultimately control the water level in a plurality of reservoirs 30 used for storing water, wherein each reservoir comprises a channel 32 positioned to drain its associated reservoir 30. The central computer 20 controls the water level by also controlling or communicating with a plurality of flow control gates 40 positioned near the plurality of the channels 32, wherein each flow control gate 40 comprises: (a) a control unit 42 communicatively coupled to the central computer 20, the control unit capable of sending a set of local condition data to the central computer 20 via a wireless connection and further capable of receiving control commands from the central computer 20; (b) an input/output interface 44 capable of receiving signals or data regarding physical conditions proximate the flow control gate 40, the input/output interface 44 coupled to the control unit 42; and (c) a water shutoff valve 46 coupled to the control unit 42 and positioned to selectively allow or block the flow of water through each channel 32, wherein each control unit 42 controls each water shutoff valve 46.

Each water shutoff valve 46 may comprise an inflatable bladder 47 or other structure, such as a motor-driven valve or a pump (such as a pump that only allows flow when it is running), or any motorized or remotely controllable gate or valve, such as a sluice gate, knife gate, slide gate, etc. with a motorized, pneumatic, or hydraulic actuation system. If an inflatable bladder 47 is used, the inflatable bladder 47 can be positioned within a channel 32 and, when inflated, will block or reduce the flow of water through the channel 32. Further, each flow control gate 40 may comprise inflation means to selectively inflate the inflatable bladder 47 under control of the control unit 42, either in response to the central computer 20, a wireless device 22 (e.g., via Bluetooth or Wi-Fi), or under autonomous control of the control unit 42. The central computer 20 or wireless device 22 may communicate with one or more flow control gates via remote communication link 24. Each flow control gate 40 may also comprise a valve 50 driven by the control unit 42 which may be opened when necessary to deflate the inflatable bladder 47 as required. Of course, the valve 50 will also be opened when the control unit 42 causes the inflatable bladder to be inflated to block water flow through channel 32. In the example embodiment, one or more flow control gates 40 may comprise an air compressor 60 coupled to the inflatable bladder 47 to selectively inflate the inflatable bladder 47 in response to commands from the control unit 42. Alternatively, the inflatable bladder 47 can be inflated from a source of compressed air at each flow control gate 40, such as a tank 62 with a refilling valve accessible from the outside of any enclosure 48, if present.

Each flow control gate 40 may further comprise a solar panel 70 adapted to charge a battery 72, wherein the battery 72 provides electrical power to the control unit 42 and the compressor 60. In example embodiments, the control unit 42, the battery 72, and the solar panel 70 may be mounted on a hollow pipe 80 or equivalent structure to allow sensitive parts of the system, and particularly of the flow control gate 40, to remain above water level and thus be somewhat protected. Further, components such as the battery 72, control unit 42, a camera 90, communication components and circuitry, antenna 92, and compressor 60 may be enclosed, partially enclosed, or protected within one or more enclosures 48.

Each flow control gate 40 may include physical components to mount the gate components on or near each channel 32 of the system. For example, the physical components may include one or more pipes 80, which can be held in place at the upstream side of each culvert by a clamp 82. The pipe may have two or more sections, or may be bent to include a substantially vertical portion 80a and a substantially horizontal portion 80b that extends into, and along the inside top of, the culvert from the upstream side, although other mounting configurations are also possible. Each flow control gate 40 may further comprise a tube 84 for providing compressed air to the associated inflatable bladder 47. Alternatively, the system may be made so that the pipe 80 provides compressed air to the inflatable bladder 47 directly.

In example embodiments, each flow control gate 40 may also include a level sensor 106 positioned near each culvert and coupled to the input/output interface 44 to provide water level data to the control unit 42. The input/output interface may comprise wires, an electrical connector, a terminal strip, or other interface components. A typical interface may include, for example, a terminal strip designed to be soldered or connected to the control unit 42, and to accept wires secured by screw terminals. The water level data may be part of the set of local condition data. The local condition data may also include image information from the camera, water flow data, battery status and charge state, bladder air pressure level, air valve position information, etc. Exemplary level sensors may include float switches, sonar sensors, LIDAR sensors, water pressure sensors, etc.

The data stored in, or accessible to, the central computer 20 comprises topographical data proximate the location of the plurality of reservoirs 30, as well as water level, flow rate, shutoff valve position, etc. The topographical data is usable by the central computer 20 to determine the quantity of water stored in each of the plurality of reservoirs 30 and for calculating or storing the water level of a river or body of water into which the reservoirs drain or feed. The topographical data may be obtained via existing topographical databases or acquired at the site using LIDAR based systems, GPS systems, survey aircraft, site surveys, drones, etc.

Each flow control gate may also comprise a plurality of sensors capable of providing sensor data to the control unit 42, the sensor data usable for control of the water shutoff valve 46. The plurality of sensors may comprise one or more of a wind monitor 102, a temperature sensor 100, a rain sensor 104, a water level/pressure sensor 106, a water flow sensor 107, an air pressure sensor 108, and a camera 90. Each control unit 42 may process, store locally, and communicate sensor data to the central computer 20. Each control unit 42 may control each water shutoff valve 46 in response to control commands received by the control unit 42 from the central computer 20, wireless device 22, or other source. For example, each control unit 42 can control each water shutoff valve 46 in response to control commands received wirelessly by the control unit 42.

B. Exemplary Communications Networks

The flood control system 10 may be utilized in either stand-alone fashion, or with any communications network (generally, remote communication link 24) capable of transmitting data including voice data and other types of electronic data. Examples of suitable communications networks for the flood control system include but are not limited to global computer networks (e.g. Internet), wireless networks, cellular networks, satellite communications networks, cable communication networks (via a cable modem), microwave communications network, local area networks (LAN), wide area networks (WAN), campus area networks (CAN), metropolitan-area networks (MAN), and home area networks (HAN). The flood control system may communicate via a single communications network or multiple communications networks concurrently. Various protocols may be utilized by the electronic devices for communications such as but not limited to HTTP, SMTP, FTP and WAP (wireless Application Protocol). The flood control system may be implemented upon various wireless networks such as but not limited to 3G, 4G, LTE, CDPD, CDMA, GSM, PDC, PHS, TDMA, FLEX, REFLEX, IDEN, TETRA, DECT, DATATAC, and MOBITEX. The flood control system may also be utilized with online services and internet service providers.

The Internet, Bluetooth links, Wi-Fi, and cellular communication systems, alone or in combination, may serve as exemplary remote communication links 24 for the flood control system 10. The Internet is comprised of a global computer network having a plurality of computer systems around the world that are in communication with one another. Via the Internet, the computer systems are able to transmit various types of data between one another. The communications between the computer systems may be accomplished via various methods including but not limited to wireless, Ethernet, Bluetooth, cable, direct connection, telephone lines, and satellite.

C. Central Computer

The central computer 20 may comprise any central computer system which is in communication with the multiple flow control gates 40 that make up part of the flood control system 10. The central computer 20 may comprise a server computer, cloud based computer, virtual computer, home computer or other computer system capable of receiving and transmitting data via IP networks and the communication networks. The central computer 20 includes or has access to a database or memory that can store information about the flood control system and flood control area. For example, the database may include topographical information and water level information for the entire flood control system 10, as well as for each of the multiple reservoirs 30 that comprise the system. The topographical information and the water level or flow information, in combination, allow the central computer to calculate or store information regarding the water volume of all or any part of the flood control system 10.

With this information, the central computer 20 can be programmed to control flooding in a geographic area. For example, since the volume of water and the level of water at any location within the flood control area can be supplied to the central computer from various sensors (such as level sensors located at individual reservoirs as well as level and flow sensors at a river, stream, etc. that the reservoirs empty into, the central computer can control the water level in the reservoirs to release as much water as possible into a river without overflow.

As can be appreciated, a modem or other communication device may be required between each of the central communication units and the corresponding communications networks. The central computer 20 may comprise any electronic system capable of receiving and transmitting information (e.g. voice data, computer data, etc.). The central computer 20 may also contain or include programming and logic to carry out the functions described below and in the various flow charts in the drawings. For example, the central computer may be programmed to recognize that flooding (e.g., due to a river cresting its banks) is imminent, by receiving local condition data, and may control the system 10 by selectively closing water shutoff valves 46 as necessary to begin using sectors or areas of land as reservoirs 30. As a concrete example, the valves 46 may be closed prior to or during heavy rainfall or prior to spring thaw.

D. Flow Control Gates

1. Overview

Figure 2:
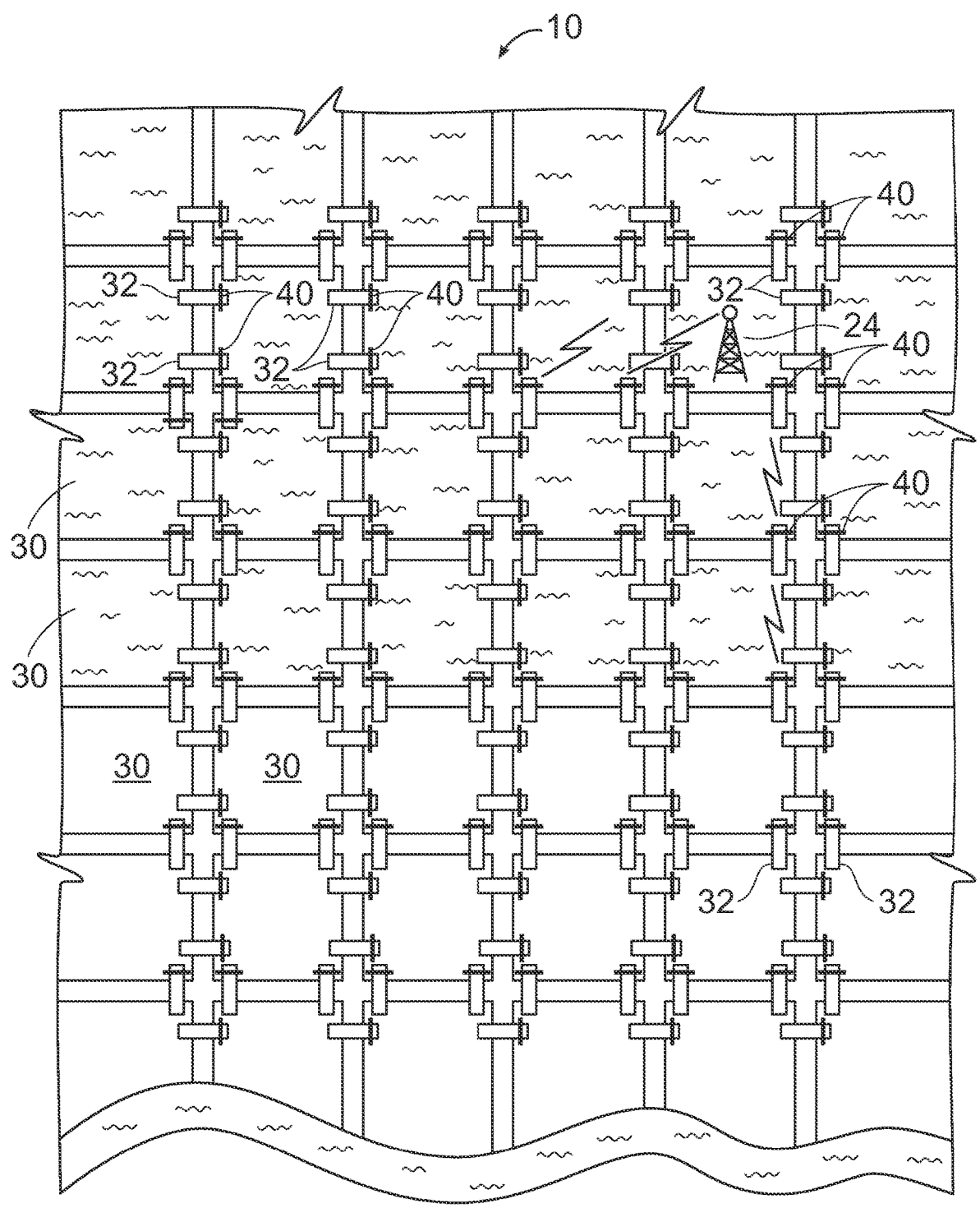
FIG. 2 is another top view of a flood control system in accordance with an example embodiment.
Figure 3A:
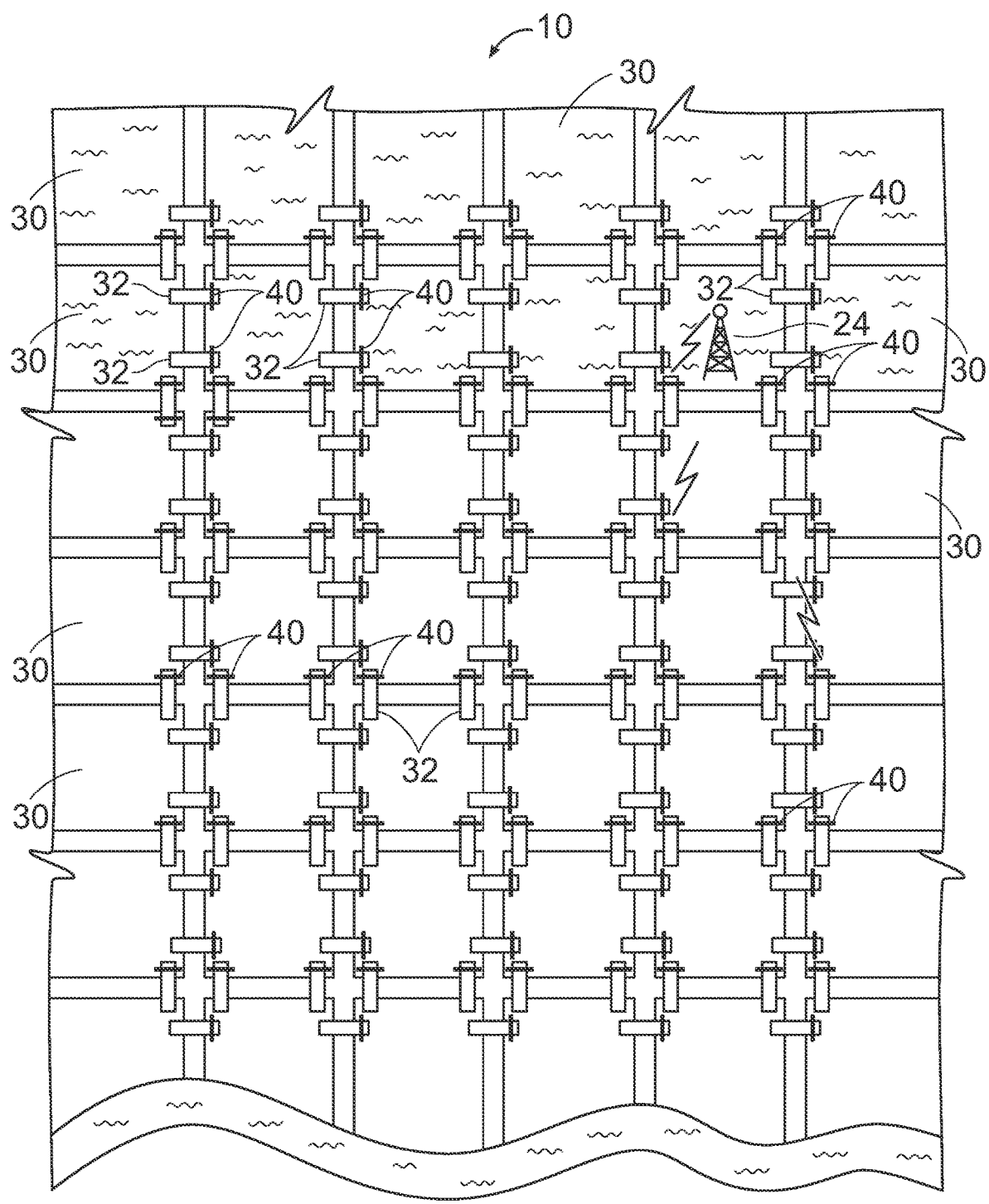
FIG. 3A is another top view of a flood control system in accordance with an example embodiment.
Figure 3B:
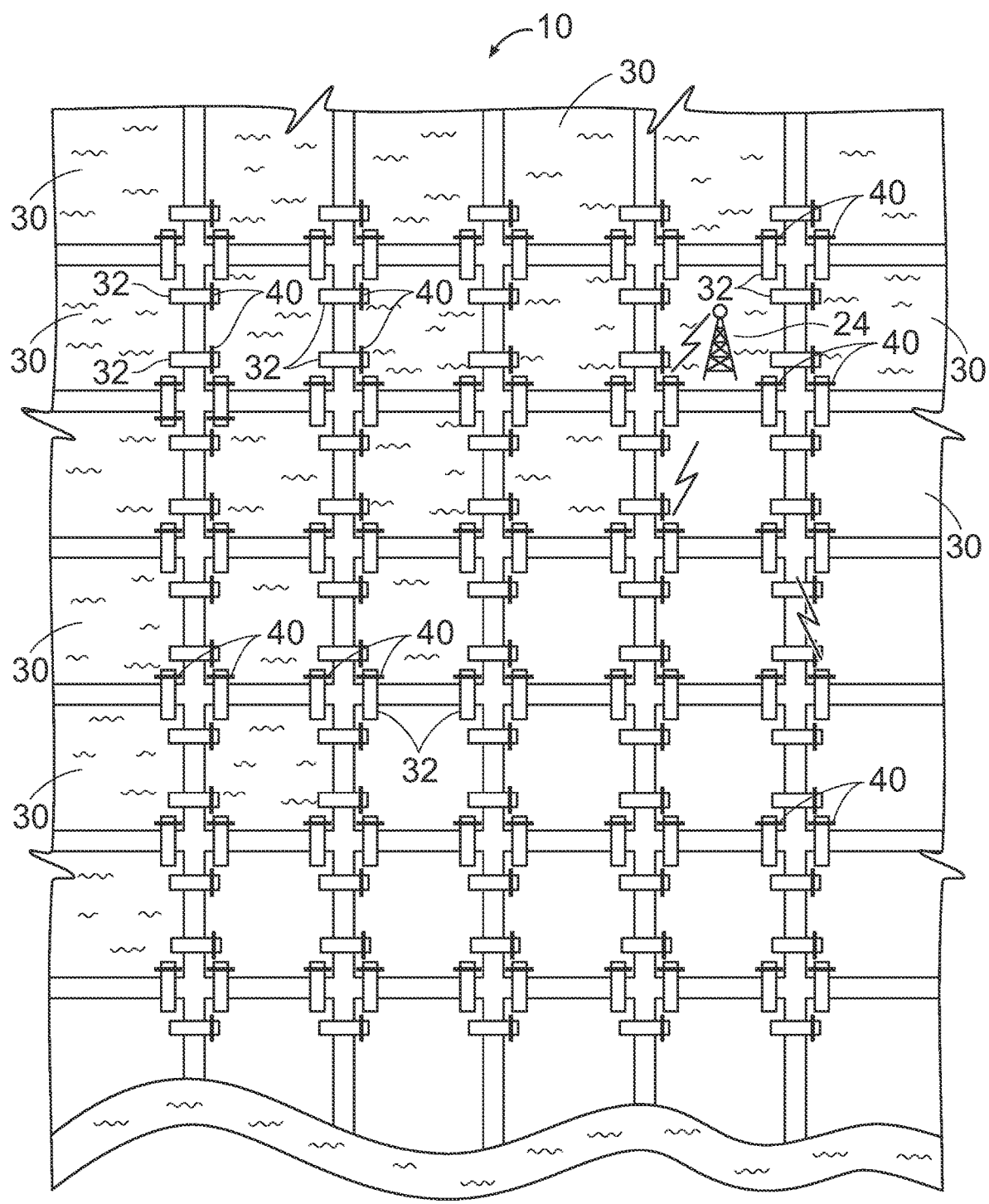
FIG. 3B is another top view of a flood control system in accordance with an example embodiment.
Figure 8:
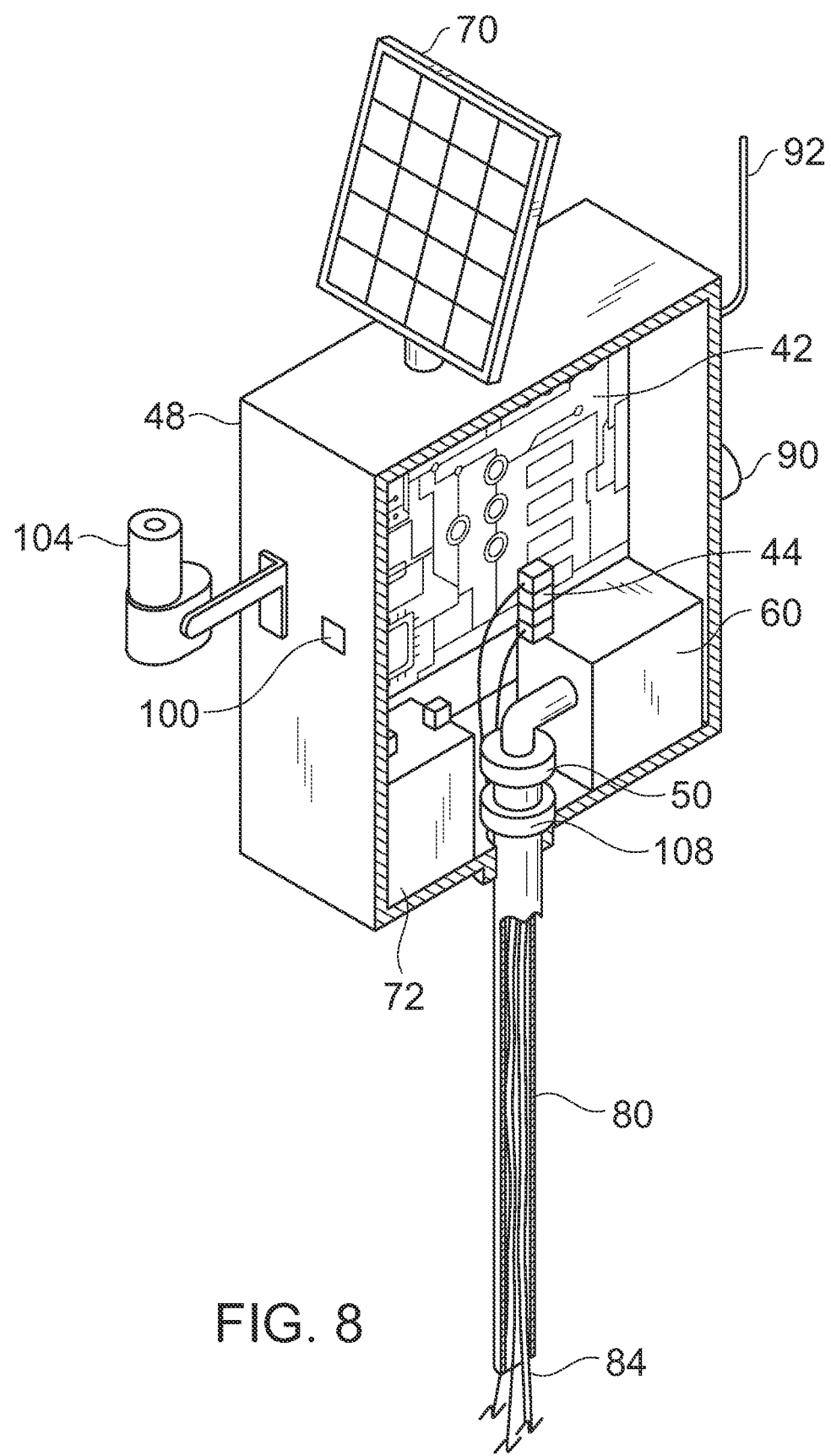
FIG. 8 is a partial sectional view of components usable with a flood control system in accordance with an example embodiment.
Figure 9:
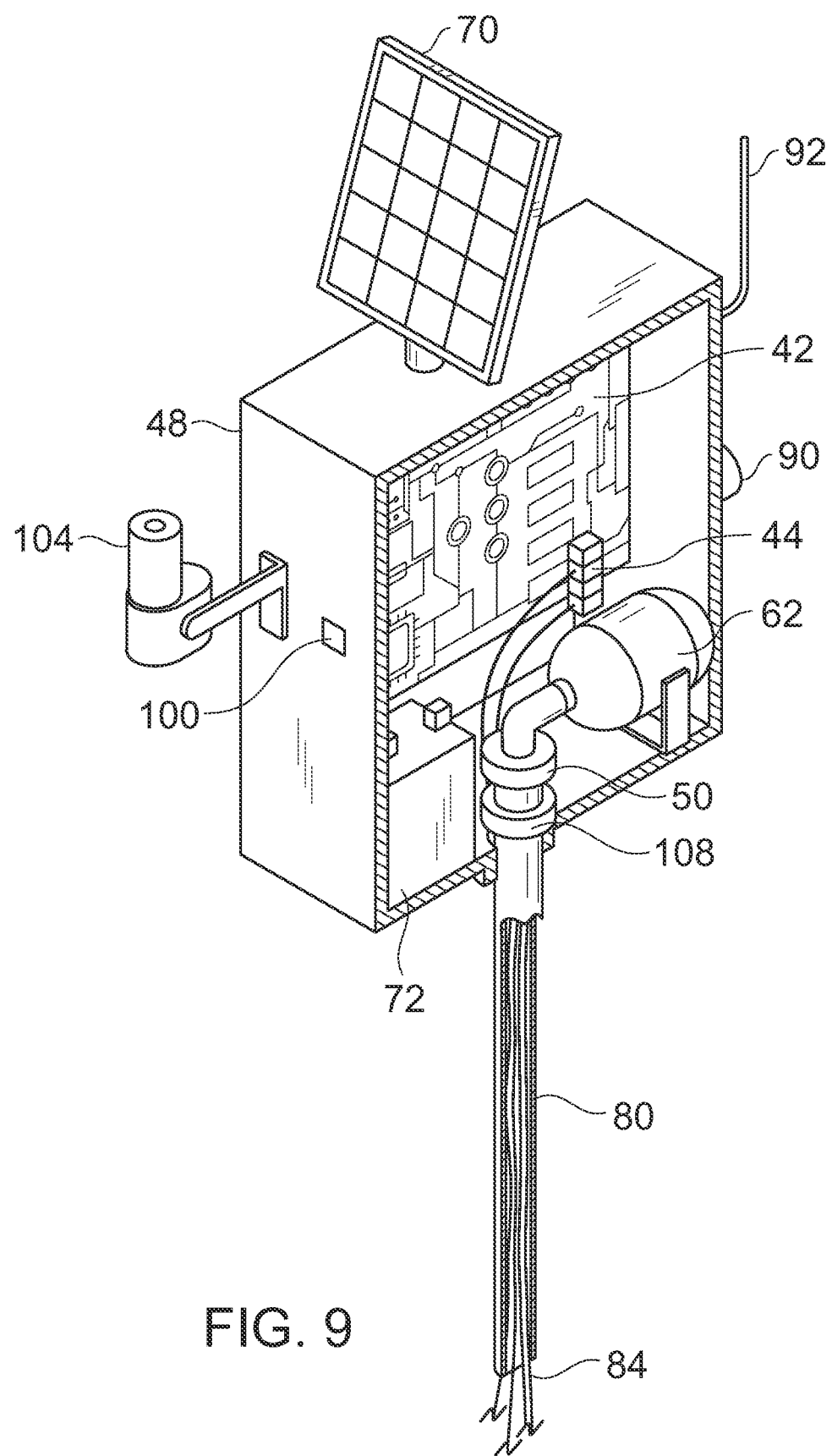
FIG. 9 is another partial sectional view of components usable with a flood control system in accordance with an example embodiment.
Figure 10:
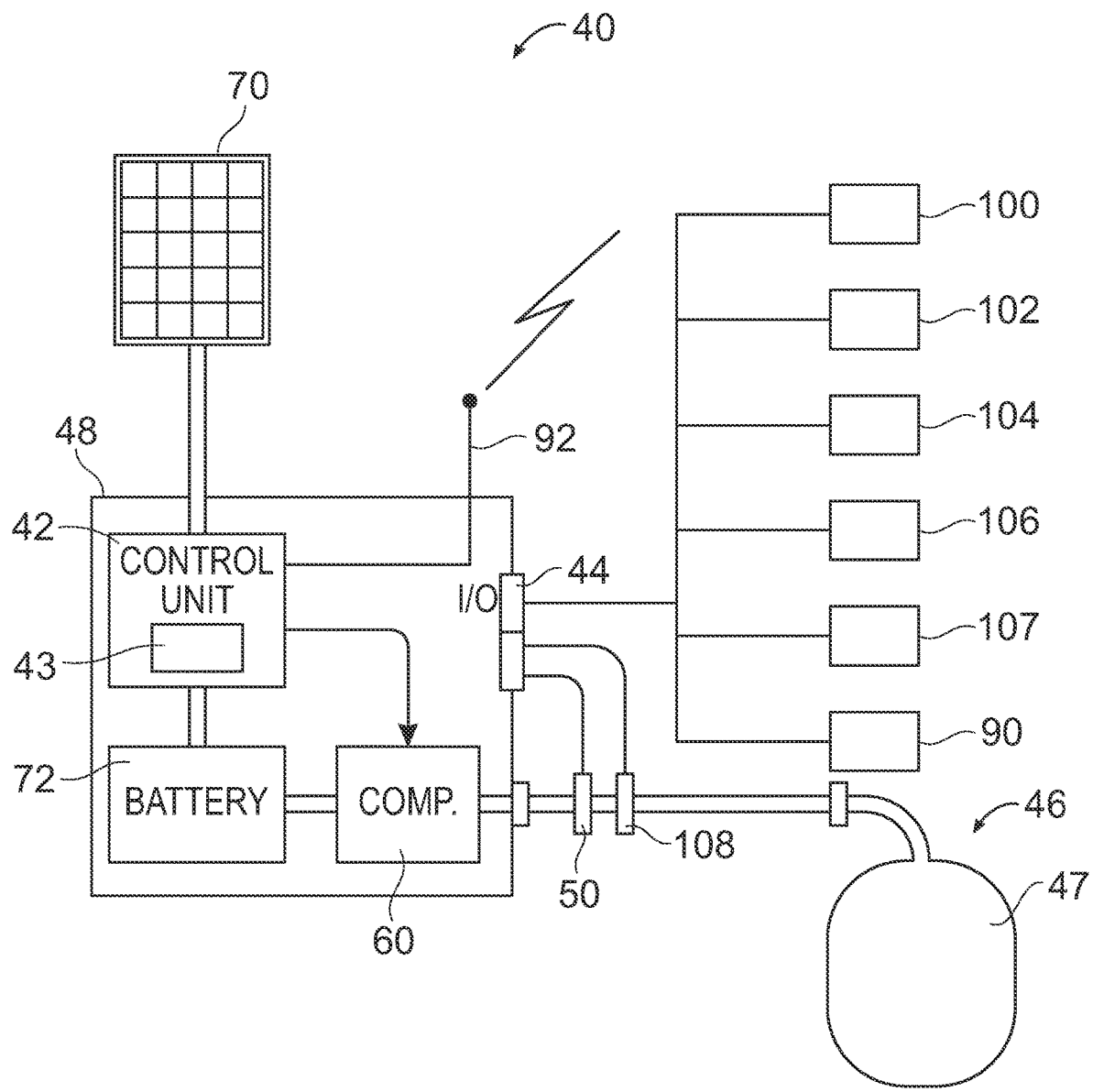
FIG. 10 is a block diagram of components usable with a flood control system in accordance with an example embodiment.
Figure 11:
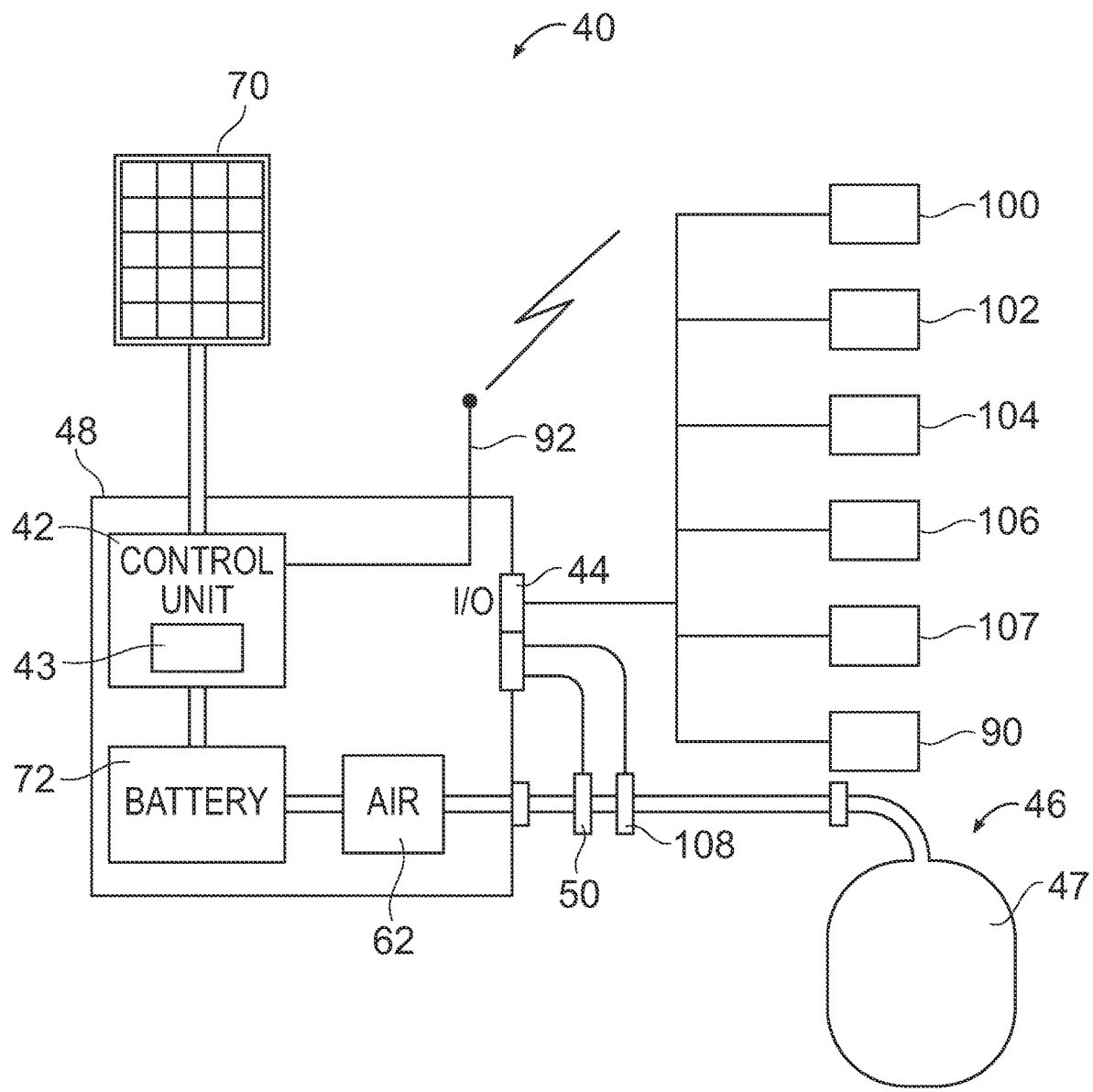
FIG. 11 is another block diagram of components usable with a flood control system in accordance with an example embodiment.
Figure 12:
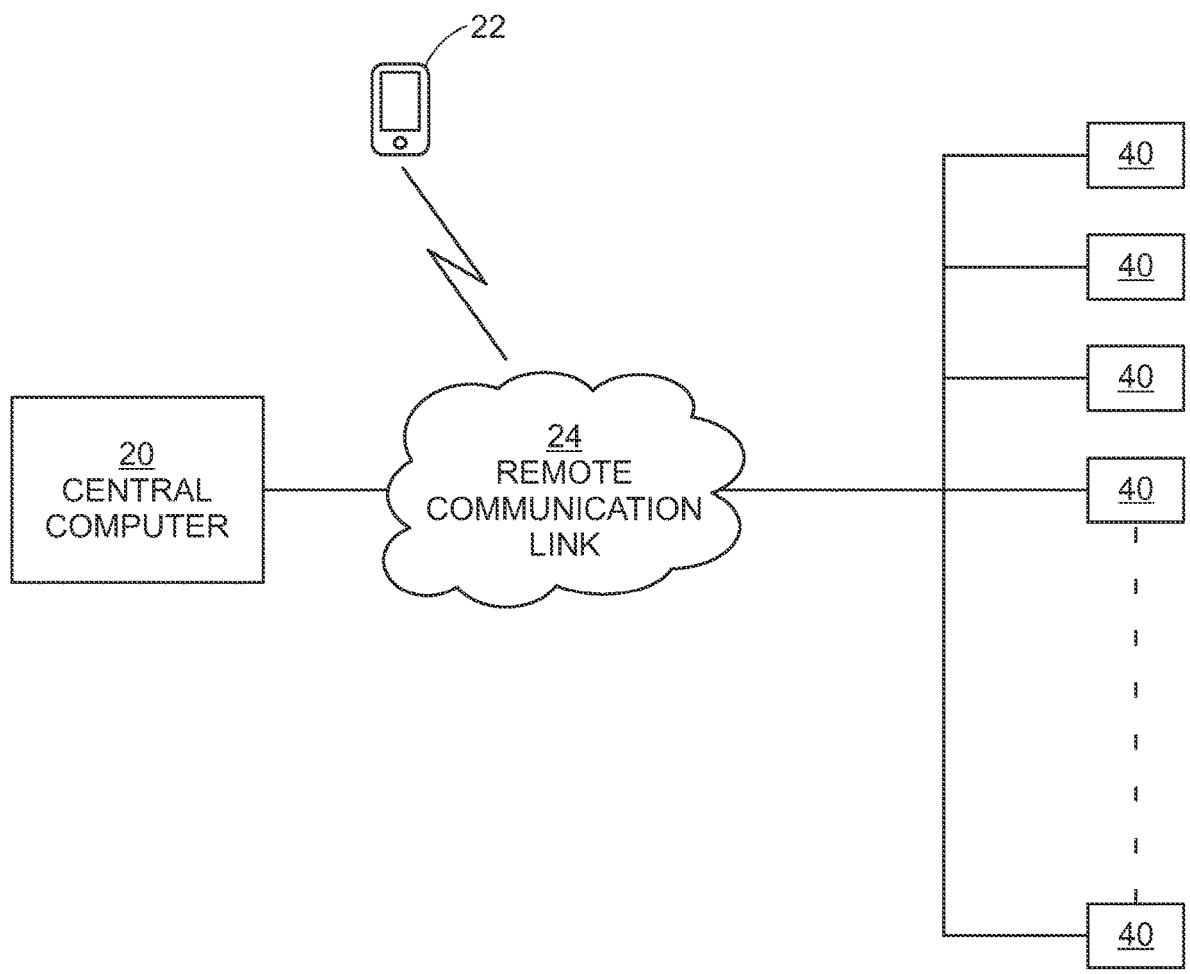
FIG. 12 is a block diagram of elements of a flood control system in accordance with an example embodiment.

Each flow control gate 40 is in effect a small subsystem of the flood control system 10, and as shown in FIGS. 1-3A and 3B, and 12, the overall system 10 comprises a number of flow control gates 40. FIGS. 10 and 11 are block diagrams that illustrate the major system components of each gate as described herein, including an enclosure 48 that houses a control unit 42, air supply 62 or compressor 60, battery 72, etc., as discussed below. Similarly, FIGS. 8 and 9 show physical embodiments of the enclosure 48 and its related components. As shown, flow control gates 40 can be placed at different orientations to allow or block flow in either direction through a channel 32. For example, as shown in FIGS. 1-3, the gates 40 can be oriented to allow flow directly toward the river or other body of water, or parallel to the river, as allowed by local topography.

The flow control gates 40 are each self-powered, remotely controllable gates that enable autonomous control, or enable the central computer 20 or a wireless device 22 to wirelessly or remotely command an associated water shutoff valve 46, such as an inflatable bladder 47, to inflate if needed and block the flow of water through a channel 32. Each flow control gate 40 comprises a control unit 42 communicatively coupled to the central computer 20, and the control unit 42 is capable of sending a set of local condition data to the central computer 20 via a wireless connection, and is further capable of receiving control commands from the central computer 20. The flow control gate 40 also includes an input/output interface 44 capable of receiving signals or data regarding physical conditions proximate the flow control gate 40, the input/output interface 44 coupled to the control unit 42.

Each flow control gate 40 also includes a water shutoff valve 46 coupled to the control unit 42 and positioned to selectively allow or block the flow of water through each channel 32, wherein each control unit 42 controls each water shutoff valve 46. As discussed above, the water shutoff valve 46 may comprise an inflatable bladder 47, or may be a mechanical valve, such as a motor-driven valve.

So that the system 10 can be self-powered, each flow control gate 40 may further comprise a solar panel 70 adapted to charge a battery 72, wherein the battery 72 provides electrical power to the control unit 42 and a compressor 60 that is used to inflate the associated bladder 47 and thus block the flow of water through the channel 32 at each particular flow control gate 40. In example embodiments, the control unit 42 may be protected by an electronics enclosure 48, which may also house or support the battery 72 and the solar panel 70. The enclosure 48, the battery 72, solar panel 70, and input/output interface 44 may be mounted on a hollow pipe 80 to keep critical or delicate components above water level and thus protected. In addition to the control unit 42, components such as the battery 72, the camera 90, communication components and circuitry, antenna 92, and compressor 60 may also be enclosed by enclosure 48.

If compressor 60 or another air supply source is enclosed, it may provide air to inflatable bladder 47 via air tube 84, which can be positioned inside of pipe 80 as shown. Alternatively, the system may be made so that the pipe 80 provides compressed air to the inflatable bladder 47 directly. As mentioned briefly above, pipe 80 can be held in place at the upstream side of each culvert by a clamp 82, which may be easily accomplished if the channel 32 is in the form of a metal tube, although the system can be adapted to work with other types of culverts as well. The pipe 80 may have two sections (such as sections at right angles) or be bent to include a substantially vertical portion 80a and a substantially horizontal portion 80b that extends into, and along the top of, the channel 32 from the upstream side.

Figure 4:
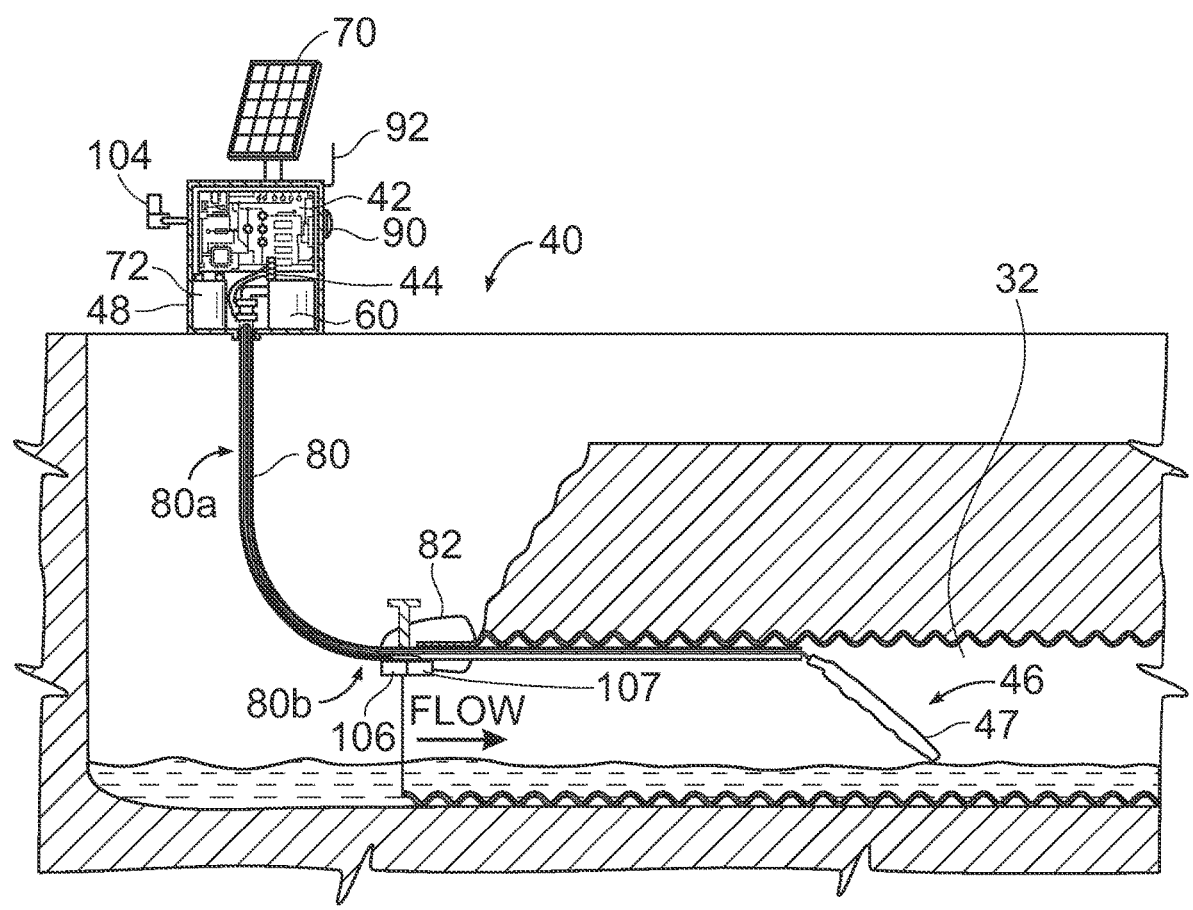
FIG. 4 is a sectional view of a control gate usable with a flood control system in accordance with an example embodiment.
Figure 5:
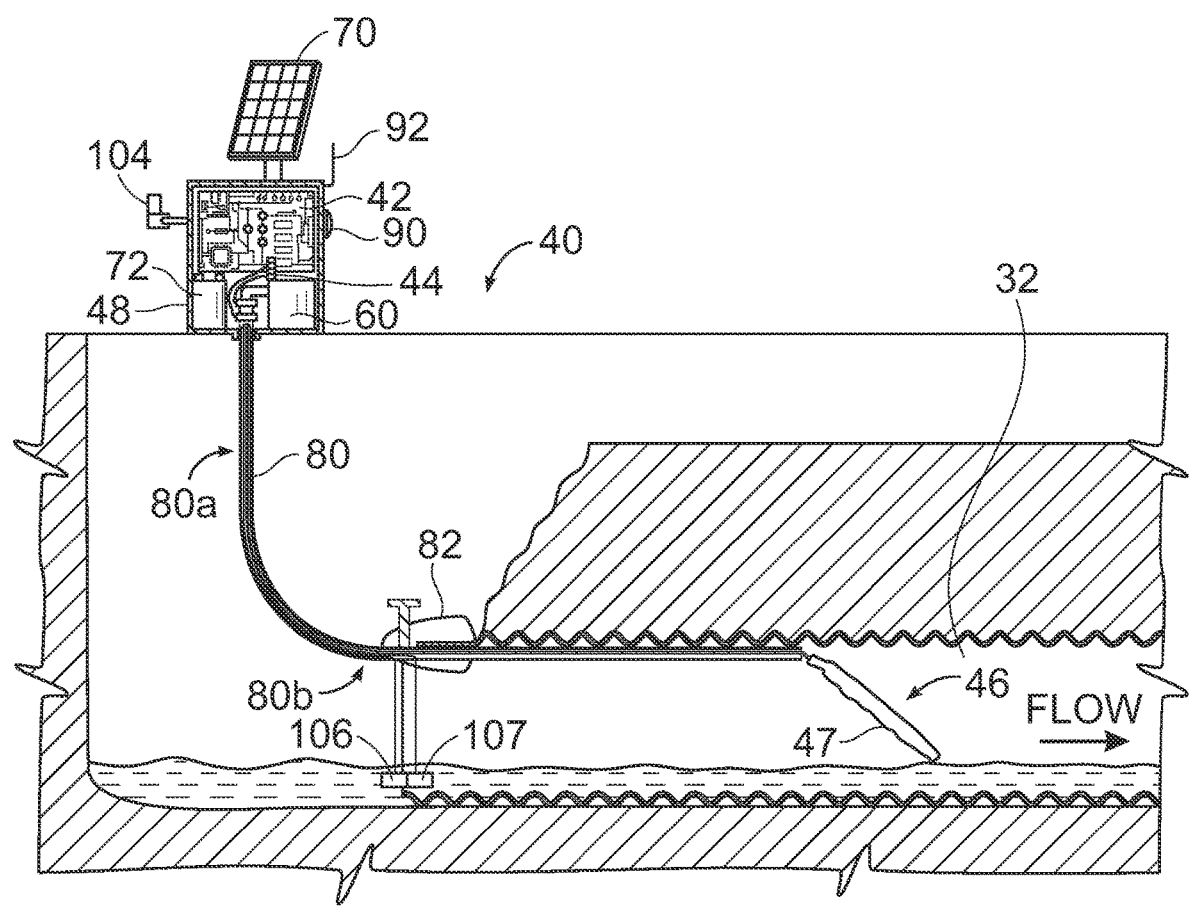
FIG. 5 is another sectional view of a control gate usable with a flood control system in accordance with an example embodiment.
Figure 6:
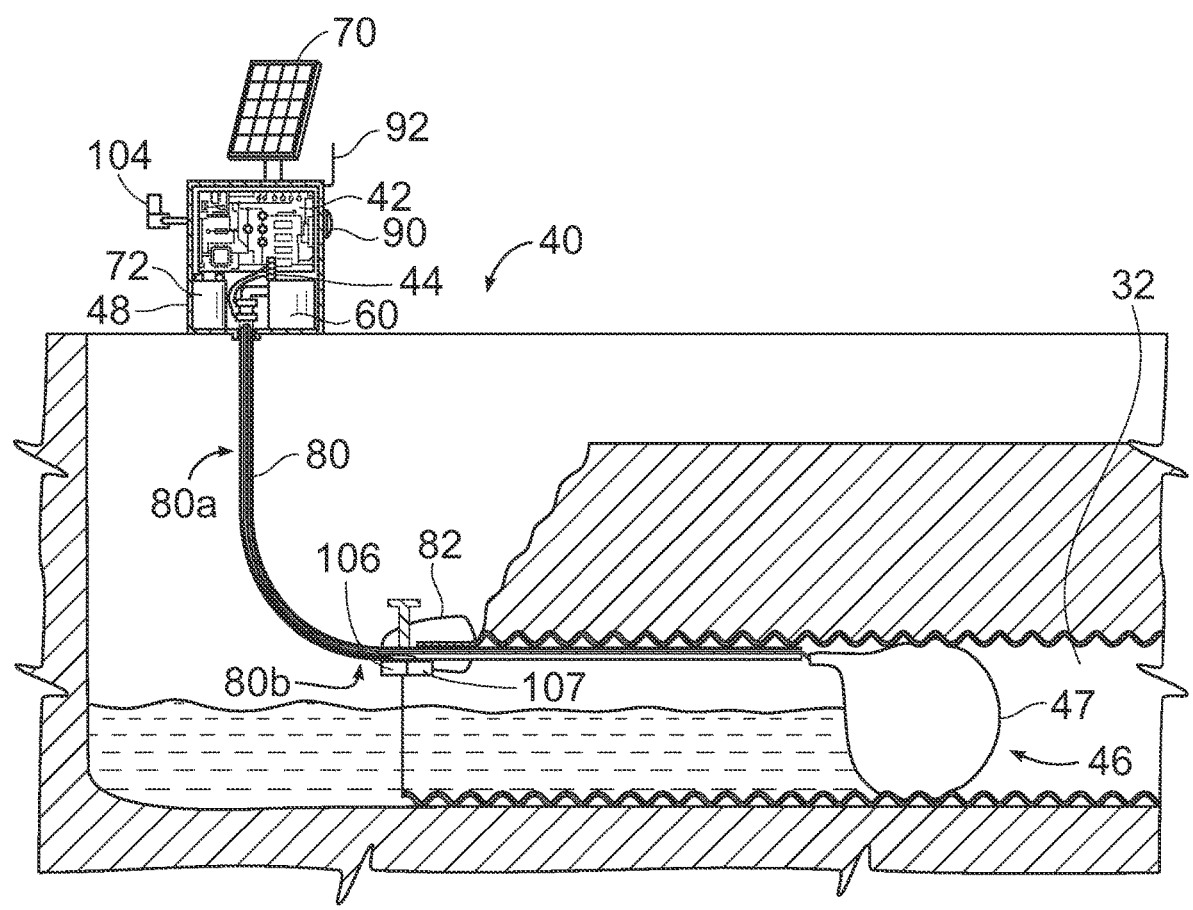
FIG. 6 is another sectional view of a control gate usable with a flood control system in accordance with an example embodiment.
Figure 7:
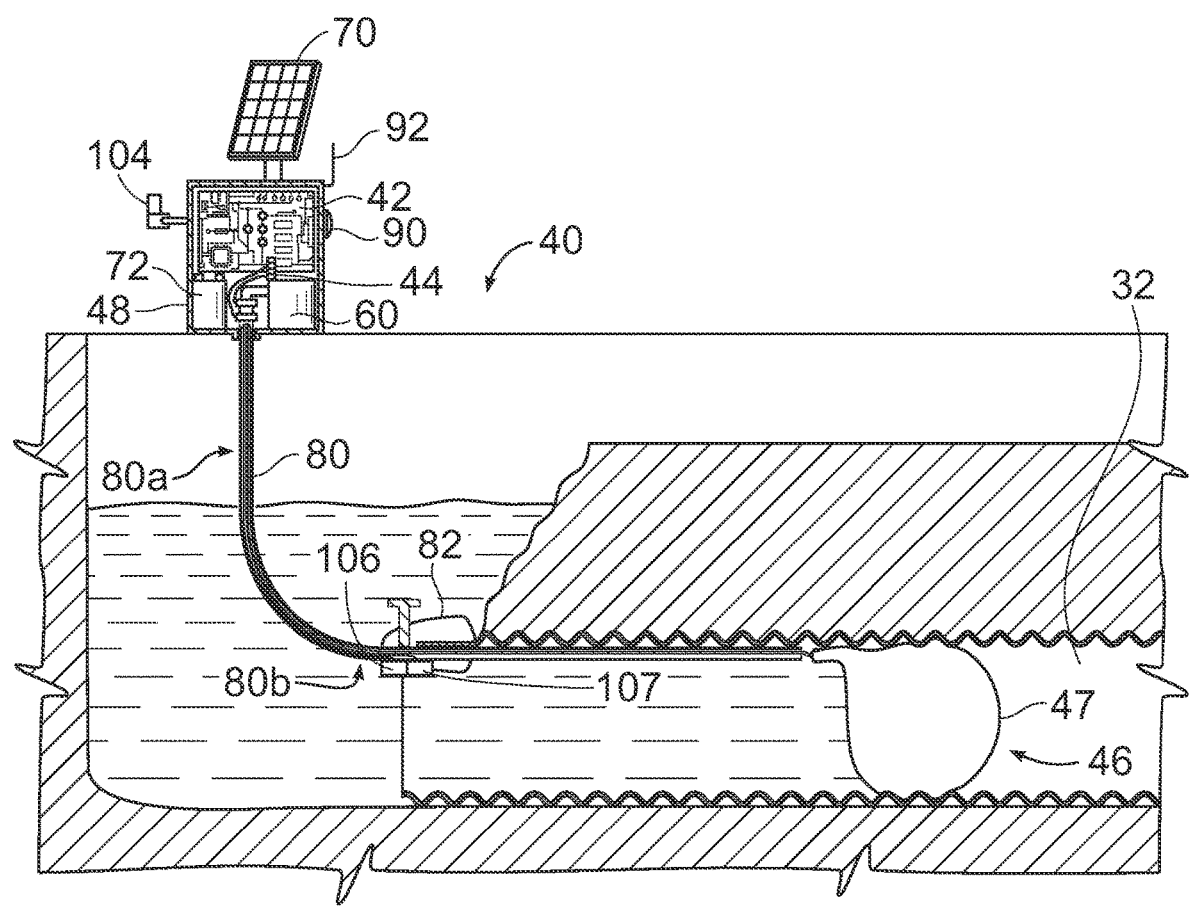
FIG. 7 is another sectional view of a control gate usable with a flood control system in accordance with an example embodiment.

Each flow control gate may be equipped with a full set of sensors so that local conditions can be supplied to the control unit 42 and communicated to the central computer 20. The sensors can include float switches or level sensors, water flow sensors, air pressure sensors, battery voltage and charge state sensors, temperature sensors, rain sensors, and a camera, by way of non-limiting example. As shown in FIGS. 4 and 6, flow sensor 107 and level sensor 106 may be located at or near clamp 82, at the top of channel 32. As shown in FIG. 5, these sensors 106, 107 or additional sensors may also be located below the top of the channel 32. These sensors may provide the central computer 20 with the local condition data at each flow control gate 40, as well as status of the gate components. For example, each control unit 42 may include memory, a processor, and instructions 43 that enable it to monitor the "health" of the system periodically or on demand, and report to the central computer 20 via remote communication link 24.

2. Control Unit

Figure 13:
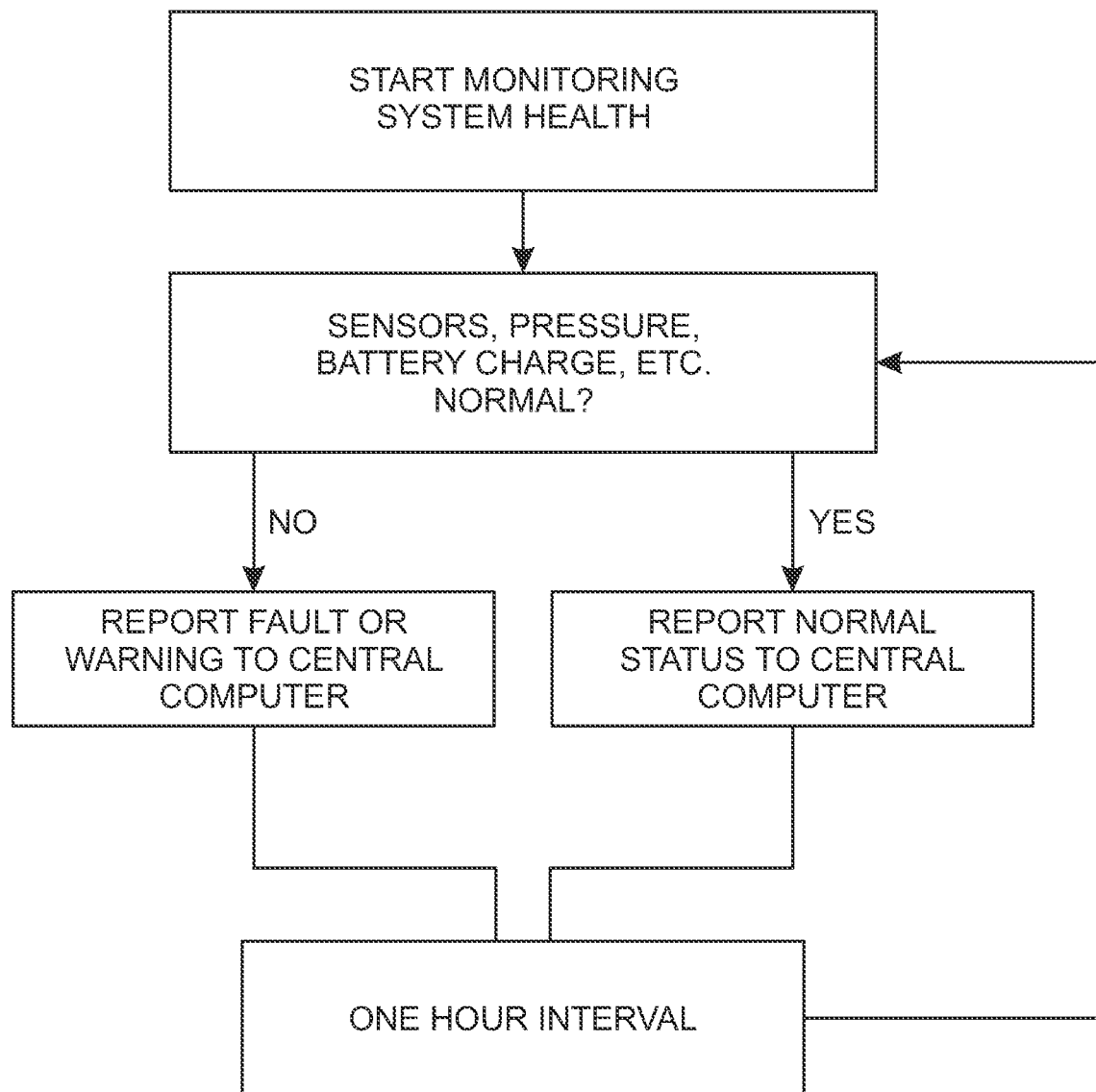
FIG. 13 is an exemplary flow chart illustrating an operation of the flood control system, according to an example embodiment.
Figure 14:
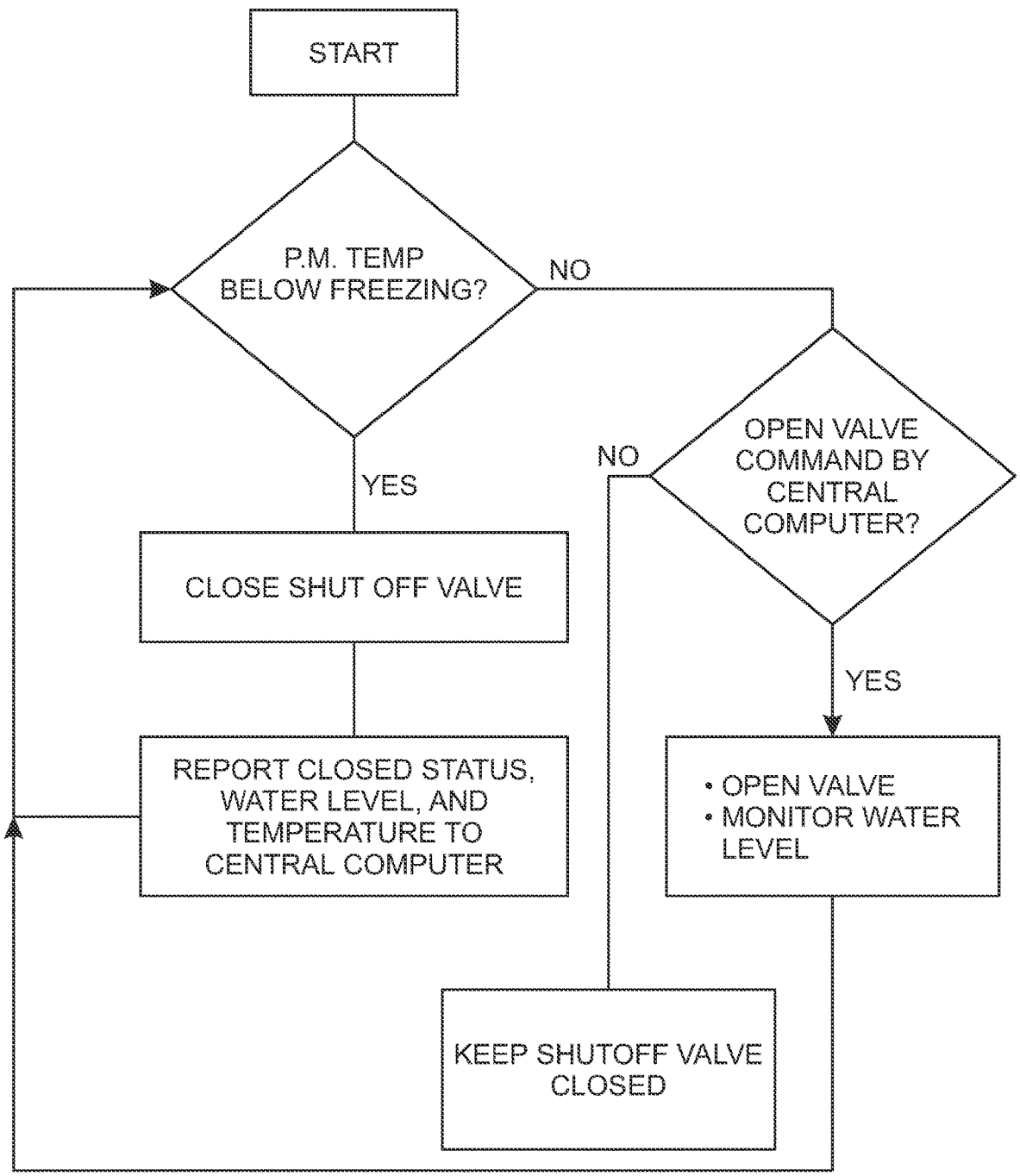
FIG. 14 is another exemplary flow chart illustrating an operation of the flood control system, according to an example embodiment.

Various functionalities of the methods and systems described herein are performed by a control unit 42 which executes control instructions 43, which may include program instructions to carry out the control and supervisory functions described herein, including those in FIGS. 13 and 14, as well as sensor inputs and communication functions. As shown in FIGS. 1-7, the flood control system 10 comprises multiple flow control gates 40, which in turn have multiple components, many of which provide inputs to, or are controlled by, the control unit 42 included in each flow control gate 40. The control unit 42 receives sensor and other inputs via input/output interface 44, and also drives various devices through input/output interface 44, which is not necessarily a single component, but may simply refer to the interface of control unit 42 with real-world devices.

The control unit 42 is capable of receiving and processing inputs from various sensors usable with system 10, and particularly, at each flow control gate 40. Such sensors include flow, pressure, and level sensors, cameras, etc. as discussed above. The control unit 42 may provide any necessary operating voltages and/or data to such sensors, as well as receiving signals representative of physical conditions from the various sensors of the system. For example, various types of sensors require voltage or current inputs in order to operate, and these can be provided by circuitry contained on the control unit 42. In addition, control unit 42 includes or may include circuitry to process sensor data and convert it to real world values, such as converting voltages or currents from temperature or pressure sensors to real-world units such as degrees and psi.

The control unit may 42 comprise any type of computer or processor and peripherals for practicing the various aspects of the flood control system, and in addition may also include analog and digital circuitry for accepting and processing inputs (such as sensor inputs) and for creating outputs, such as digital communications signals comprising operational status and on-site conditions, and outputs to drive devices such as compressors and valves or various types utilized by the flood control system. The control unit 42 may operate in a stand-alone capacity or may be operated remotely, such as under command of a remote, central computer 20 or other device that is in control of, or can provide commands to, system 10.

In addition, each control unit 42 can control its own gate 40 without communications with the central computer 20, based on logic preloaded or uploaded to the control unit 42 at any time. For example, the system, including a large number of gates 40, can operate autonomously and effectively based on known seasonal, measured, and other conditions, and may thus prevent or reduce flooding and optimize water storage and usage without accessing the remote, central computer 20. Further, each control unit 42 of a gate 40 can communicate directly, via known wireless protocols, with other control units 42 and gates 40 in the system, again without need for communicating with central computer 20. In this way, the system 10 can act in a stand-alone, coordinated fashion even in the event of a failure of communications with central computer 20. In stand-alone mode, it may be beneficial for multiple gates to communicate with each other, in order to anticipate and prepare in advance for a large amount of water, such as from high precipitation or snow melt, etc.

For example, a control unit 42, through its sensors or communications, may have data indicating its reservoir 30 is at a high level, and may also have received, from any source, information that additional water is expected within a given time period. The communication with other control units 42 may indicate that it would thus be optimal, for example, for downstream gates 40 to open and release their water prior to additional water being introduced to the system, so that the high level reservoir can begin emptying in advance of the expected addition of water to the system.

The control unit 42 may also comprise various other electronic devices and/or circuitry capable of sending and receiving electronic data, including but not limited to smartphones, mobile phones, cellular communications subsystems (such as wireless communications devices of the type found in home security systems) telephones, mobile electronic devices, handheld wireless devices, two-way radios, communicators, video viewing units, television units, television receivers, pagers, communication devices, and digital satellite receiver units.

The control unit 42 may comprise any conventional computer, or a special purpose computer—for example, the control unit may comprise a printed circuit board specially designed to fit within a weatherproof enclosure 48, with a microprocessor system, communication system, and battery charging circuitry, as well as input and output circuitry to interface with the sensors, compressors, and valves described herein. The control unit 42 may include a microprocessor, a memory bus, random access memory (RAM), read only memory (ROM), a peripheral bus, and other components. The microprocessor can be a general-purpose digital processor that controls the operation of the control unit. The microprocessor can be a single-chip processor or it may be implemented with multiple components. Using instructions retrieved from memory, the microprocessor controls the reception and manipulations of input data and the output and display of data on output devices. The memory bus is utilized by the microprocessor to access the RAM and the ROM. RAM is used by microprocessor as a general storage area and as scratch-pad memory, and can also be used to store input data and processed data.

ROM can be used to store instructions or program code followed by microprocessor as well as other data. A peripheral bus is used to access the input, output and storage devices used by the computer. In the described embodiments, these devices include a display screen, a printer device, a hard disk drive or other storage, and a network interface. The hard disk drive/storage unit can be utilized to store various types of data. The microprocessor together with an operating system operates to execute computer code and produce and use data. The computer code and data may reside on RAM, ROM, or hard disk drive or solid state drive. The computer code and data can also reside on a removable program medium and loaded or installed onto computer system when needed. Removable program media include, for example, CD-ROM, PC-CARD, USB drives, floppy disk and magnetic tape. The network interface circuit is utilized to send and receive data over a network connected to other computer systems. An interface card or similar device and appropriate software implemented by microprocessor (either the main microprocessor or a separate, dedicated communications microprocessor) can be utilized to connect the computer system to an existing network and transfer data according to standard protocols.

3. Water Shutoff Valve

Each flow control gate 40 may comprise a water shutoff valve 46, which may comprise an inflatable bladder 47 or balloon, or may be a mechanical valve (e.g. mechanical gates, mechanical valves, butterfly valve, guillotine lock, guillotine gate, floodgates, canal gates, slide gates). The mechanical valves may be comprised of a motorized mechanical valve (e.g. electrically powered, gas powered etc.), a motorized pump (e.g. electrically powered pump, gas powered pump), or actuator (e.g. electrical actuator, electrically powered linear actuator, rotating actuator, etc.).

In the case of an inflatable bladder 47, the pipe 80 may carry, directly or via inner air tube 83, air from a tank 62 or compressor 60 for inflating the bladder. Control unit 42 may send commands to compressor 60 and air valve 50 as needed to open a path and provide compressed air to inflatable bladder 47. Once inflated, the control unit 42 may further send a command to close air valve 50 so that bladder 47 remains inflated, thus stopping any water flow through the culvert, without any additional power or output needed until the bladder is to be deflated. The bladder 47 may further comprise an airtight inner portion and a more rugged exterior portion, such as a fabric material. The bladder 47 may be compliant, such that it conforms to irregularities, rocks, etc. in the culvert and is still able to seal or prevent water flow.

In addition to an air valve 50, each flow gate may include an air pressure sensor 108, so that control unit 42 can readily monitor the status of the flow gate 40 (e.g., presence of air pressure indicates that the shutoff valve is closed). The pressure sensor 108 can also be used to monitor the "health"

of the system: in case the status indicates that the bladder 47 is expected to be inflated (closed) but there is no or low pressure, the control unit 42 can report a fault to the central computer 20, as shown in FIG. 13.

E. Operation of Preferred Embodiment

In use, each flow control gate 40 is self-powered, and may act autonomously, partially autonomously, or under control or a central computer 20 or wireless device 22. The use of a solar panel 70 and rechargeable battery 72 allows for such operation, with control unit 42 controlling the charging of the battery 72 and routing of power as needed to the components of each flow control gate 40. One or more components of the system may be contained in an enclosure 48, which is typically held above road level (and thus, expected water level), as shown for example in FIGS. 4-9.

In a typical case, as outlined in FIG. 14, when the night temperature starts to drop below freezing, each control unit 42 may close the shutoff valve 46 on a long-term basis, i.e., under the assumption that winter has arrived and there will be no ongoing changes needed. The closed status, water level, and temperature can all be monitored by the sensors described herein, and communicated to the central computer 20. This control function can be performed entirely by control unit 42, or may be placed under control of the central computer 20. This sets the desired conditions of the system 10 for the next thaw, in anticipation of a high flow to the river. In the absence of freezing temperatures, the control unit 42 can be under command of the central computer. If no command to open the valve 46 is received, the valve will remain closed. If a command to open the valve 46 is received, the valve will be opened and the water level, flow, etc., will be monitored.

With all the flow control gates 40 open and under dry conditions, the system may assume the status shown in FIG. 1, with no water standing in the reservoirs 30. In high water conditions, such as spring thaw or heavy rains, some or all of the reservoirs may be full. Retaining water in the reservoirs can help build subsoil moisture levels prior to releasing the water to the river. Retention also thaws the ground below the water more quickly and allows for evaporation of the water at the surface. Such evaporation can be quite high, and can significantly reduce the amount of water that ultimately reaches the river, further limiting flooding.

Either on a periodic basis (such as daily, weekly, etc.) or during heavy rainfall, as sensed by rain sensor 104 or communicated to control unit 42 from the remote communication link 24, each gate 40, or a plurality of gates 40, may close valve 46 as best shown in FIG. 6, at which time the water level can be sensed by level sensor 106. In addition, water flow prior to closing can also be sensed by flow sensor 107 and used by the system to make logical decisions based on local conditions, such as possible existence of flooding conditions.

In addition to individual water levels at each flow control gate 40, the system may use data accessible to central computer 20, including topographical information, to form a data picture of the amount of water retained in the entire system 10, or parts of it. The system can then control the gates 40 and shutoff valves 46 to retain a calculated amount of water, and to allow some water to flow into the river at rates that are less than rates that would cause cresting. As an example, when water is to be released, it will typically be released from the reservoirs 30 closest to the river first, as illustrated by FIGS. 2 and 3A and 3B, where increasing amounts of water have been released, and some water, farther from the river, is still being retained. Depending on the local topography and conditions in each reservoir, water may be stored and released in different patterns to optimize water storage or soil conditions. An example of this is shown in FIG. 3B, wherein different gates 40 oriented in different directions have been used to retain water in reservoirs in a jagged-edge pattern, rather than simply retaining water above a certain distance from the river. In addition to the pattern shown, other patterns are also possible.

As outlined in FIG. 13, in addition to the operation to control the shutoff valves, each flow control gate 40 can also monitor the health status of the various system components, and report the status as needed to the central computer 20, which can alert any user that maintenance may be needed. The status conditions that may be monitored include sensor health, air pressure, pressure and valve status agreement, battery charge and voltage, etc. The conditions, and others, can be monitored and reported periodically, such as hourly. Further, if such hourly reports are not made, the status of a possible flow control gate failure or communication failure can be assumed, and such messages can be sent from the central computer 20 to any users as well.

Any and all headings used herein are for convenience only and have no limiting effect. Unless otherwise defined, all technical and scientific terms used herein have the same meaning as commonly understood by one of ordinary skill in the art to which this invention belongs. Although specific terms are employed herein, they are used in a generic and descriptive sense only and not for purposes of limitation. All publications, patent applications, patents, and other references mentioned herein are incorporated by reference in their entirety to the extent allowed by applicable law and regulations.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs), DVDs (digital video discs), and computer instruction signals embodied in a transmission medium (with or without a carrier wave upon which the signals are modulated). For example, the transmission medium may include a communications network, such as the Internet.

At least one embodiment of the flood control system 10 is described above with reference to block and flow diagrams of systems, methods, apparatuses, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments of the invention may provide for a computer program product, comprising a computer usable medium having a computer-readable program code or program instructions embodied therein, the computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks. Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

The present invention may be embodied in other specific forms without departing from the spirit or essential attributes thereof, and it is therefore desired that the present embodiment be considered in all respects as illustrative and not restrictive. Many modifications and other embodiments of the flood control system 10 will come to mind to one skilled in the art to which this invention pertains and having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although methods and materials similar to or equivalent to those described herein can be used in the practice or testing of the flood control system, suitable methods and materials are described above. Thus, the flood control system 10 is not intended to be limited to the embodiments shown, but is to be accorded the widest scope consistent with the principles and features disclosed herein.

What is claimed is:

1. A flood control system, comprising:
a plurality of reservoirs for storing water;
a plurality of channels fluidly connected between the plurality of reservoirs, wherein each of the plurality of channels is adapted for drainage of water from one of the plurality of reservoirs to an adjacent reservoir of the plurality of reservoirs;
a central computer configured for receiving data, storing data, and providing control commands, wherein the data stored in the central computer comprises topographical data corresponding to each of the plurality of reservoirs, the topographical data usable by the central computer to determine a quantity of water stored in each of the plurality of reservoirs;
a plurality of control units in communication with the central computer, wherein the plurality of control units are capable of sending a set of local condition data to the central computer and further capable of receiving control commands from the central computer; and
a plurality of water shutoff valves, wherein each of the plurality of water shutoff valves is positioned near a corresponding channel of the plurality of channels, wherein each of the plurality of water shutoff valves is positioned to selectively allow or block a flow of water through the corresponding channel, and wherein each of the plurality of water shutoff valves is controlled by a corresponding control unit of the plurality of control units.

2. The flood control system of claim 1, wherein each of the plurality of water shutoff valves comprises an inflatable bladder.

3. The flood control system of claim 1, further comprising a plurality of water level sensors, wherein each of the plurality of water level sensors are in communication with one of the plurality of control units.

4. The flood control system of claim 3, wherein each of the plurality of control units communicate a water level data received from a corresponding water level sensor of the plurality of water level sensors to the central computer.

5. The flood control system of claim 1, further comprising a plurality of sensors, wherein each of the plurality of sensors are in communication with one of the plurality of control units.

6. The flood control system of claim 5, wherein each of the plurality of sensors comprises a wind monitor, a temperature sensor, a rain sensor, a water level sensor, a water pressure sensor, an air pressure sensor, a voltage sensor, or a camera.

7. The flood control system of claim 1, wherein each of the plurality of control units controls one of the plurality of water shutoff valves in response to control commands received from the central computer.

8. The flood control system of claim 1, wherein each of the plurality of control units controls one of the plurality of water shutoff valves in response to control commands received wirelessly from the central computer.

9. The flood control system of claim 1, wherein the central computer selectively controls each of the plurality of water shutoff valves such that a known total quantity of water is stored by the flood control system.

10. A flood control system, comprising:
a plurality of reservoirs arranged in a grid pattern for storing water, the grid pattern comprising reservoirs arranged in at least two columns and at least two rows;
a plurality of channels fluidly connected between the plurality of reservoirs, wherein each of the plurality of channels is adapted for drainage of water from one of the plurality of reservoirs to an adjacent reservoir of the plurality of reservoirs, wherein a first channel of the plurality of channels fluidly connects a first reservoir of the plurality of reservoirs and a second reservoir of the plurality of reservoirs that is adjacent to the first reservoir in a common row, and wherein a second channel of the plurality of channels fluidly connects the first reservoir and a third reservoir of the plurality of reservoirs that is adjacent to the first reservoir in a common column;
a central computer configured for receiving data, storing data, and providing control commands, wherein the data stored in the central computer comprises a quantity of water stored in each of the plurality of reservoirs; and a plurality of water shutoff valves, wherein each of the plurality of water shutoff valves is positioned near a corresponding channel of the plurality of channels, and wherein each of the plurality of water shutoff valves is controllable by the central computer to selectively allow or block a flow of water through the corresponding channel of the plurality of channels;

wherein the central computer uses the data to control the plurality of water shutoff valves such that water is selectively stored in some reservoirs in the plurality of reservoirs, and selectively drained from some reservoirs in the plurality of reservoirs, such that water is stored in a pattern.

11. The flood control system of claim 10, wherein the pattern comprises a pattern that optimizes soil conditions.

12. The flood control system of claim 10, wherein the pattern comprises a pattern that optimizes water storage.

13. The flood control system of claim 10, wherein the central computer controls the plurality of water shutoff valves to retain a known amount of water.

14. The flood control system of claim 10, wherein the data stored in the central computer comprises topographical data.

15. The flood control system of claim 10, wherein the central computer controls the plurality of water shutoff valves to retain water in some reservoirs of the plurality of reservoirs such that a jagged-edge pattern is created, wherein water is stored in some of the reservoirs on a side of the jagged-edge pattern, and wherein water is not stored in some of the reservoirs on an opposite side of the jagged-edge pattern.

16. A flood control system, comprising:
a plurality of reservoirs arranged in a grid pattern having at least two columns of reservoirs and at least two rows of reservoirs;
a plurality of channels fluidly connected between the plurality of reservoirs, wherein each of the plurality of channels is adapted for drainage of water from one of the plurality of reservoirs to an adjacent reservoir of the plurality of reservoirs;
wherein a first channel of the plurality of channels fluidly connects a first reservoir of the plurality of reservoirs and a second reservoir of the plurality of reservoirs, wherein the first reservoir is adjacent to the second reservoir, and wherein the first reservoir and the second reservoir are in a first row of the at least two rows of reservoirs;
wherein a second channel of the plurality of channels fluidly connects the first reservoir and a third reservoir of the plurality of reservoirs, wherein the first reservoir is adjacent to the third reservoir, and wherein the first reservoir and the third reservoir are in a first column of the at least two columns of reservoirs;
wherein a third channel of the plurality of channels fluidly connects the third reservoir and a fourth reservoir of the plurality of reservoirs, wherein the third reservoir is adjacent to the fourth reservoir, and wherein the third reservoir and the fourth reservoir are in a second row of the at least two rows of reservoirs;
wherein a fourth channel of the plurality of channels fluidly connects the second reservoir and the fourth reservoir of the plurality of reservoirs, wherein the second reservoir is adjacent to the fourth reservoir, and wherein the second reservoir and the fourth reservoir are in a second column of the at least two columns of reservoirs;
a central computer configured for receiving data, storing data, and providing control commands; and
a plurality of water shutoff valves, wherein each of the plurality of water shutoff valves is positioned near a corresponding channel of the plurality of channels, and wherein each of the plurality of water shutoff valves is controllable by the central computer to selectively allow or block a flow of water through the corresponding channel of the plurality of channels;
wherein the central computer uses the data to control the plurality of water shutoff valves such that water is selectively stored in a first group of storage reservoirs of the plurality of reservoirs, and selectively drained for a second group of reservoirs of the plurality of reservoirs.

17. The flood control system of claim 16, wherein the central computer selectively controls each of the plurality of water shutoff valves such that a known total quantity of water is stored by the flood control system.

18. The flood control system of claim 16, wherein the data stored in the central computer comprises topographical data corresponding to each of the plurality of reservoirs, the topographical data usable by the central computer to determine a quantity of water stored in each of the plurality of reservoirs.

19. The flood control system of claim 16, wherein a fifth channel of the plurality of channels fluidly connects the third reservoir and a fifth reservoir of the plurality of reservoirs, wherein the third reservoir is adjacent to the fifth reservoir, and wherein the third reservoir and the fifth reservoir are in the first column of the at least two columns of reservoirs;
wherein a sixth channel of the plurality of channels fluidly connects the fifth reservoir and a sixth reservoir of the plurality of reservoirs, wherein the fifth reservoir is adjacent to the sixth reservoir, and wherein the fifth reservoir and the sixth reservoir are in a third row of the at least two rows of reservoirs; and
wherein a seventh channel of the plurality of channels fluidly connects the fourth reservoir and the sixth reservoir, wherein the fourth reservoir is adjacent to the sixth reservoir, and wherein the fourth reservoir and the sixth reservoir are in the second column of the at least two columns of reservoirs.

20. The flood control system of claim 19, wherein an eighth channel of the plurality of channels fluidly connects the second reservoir and a seventh reservoir of the plurality of reservoirs, wherein the second reservoir is adjacent to the seventh reservoir, and wherein the second reservoir and the seventh reservoir are in the first row of the at least two rows of reservoirs;
wherein a ninth channel of the plurality of channels fluidly connects the fourth reservoir and an eighth reservoir of the plurality of reservoirs, wherein the fourth reservoir is adjacent to the eighth reservoir, and wherein the fourth reservoir and the eighth reservoir are in the second row of the at least two rows of reservoirs;
wherein a tenth channel of the plurality of channels fluidly connects the seventh reservoir and the eighth reservoir, wherein the seventh reservoir is adjacent to the eighth reservoir, and wherein the seventh reservoir and the eighth reservoir are in a third column of the at least two columns of reservoirs;
wherein an eleventh channel of the plurality of channels fluidly connects the sixth reservoir and a ninth reservoir of the plurality of reservoirs, wherein the sixth reservoir is adjacent to the ninth reservoir, and wherein the sixth reservoir and the ninth reservoir are in the third row of the at least two rows of reservoirs; and wherein a twelfth channel of the plurality of channels fluidly connects the eighth reservoir and the ninth reservoir, wherein the eighth reservoir is adjacent to the ninth reservoir, and wherein the eighth reservoir and the ninth reservoir are in the third column of the at least two columns of reservoirs.

\* \* \* \* \*